United States Patent Office 2,737,018
Patented Mar. 6, 1956

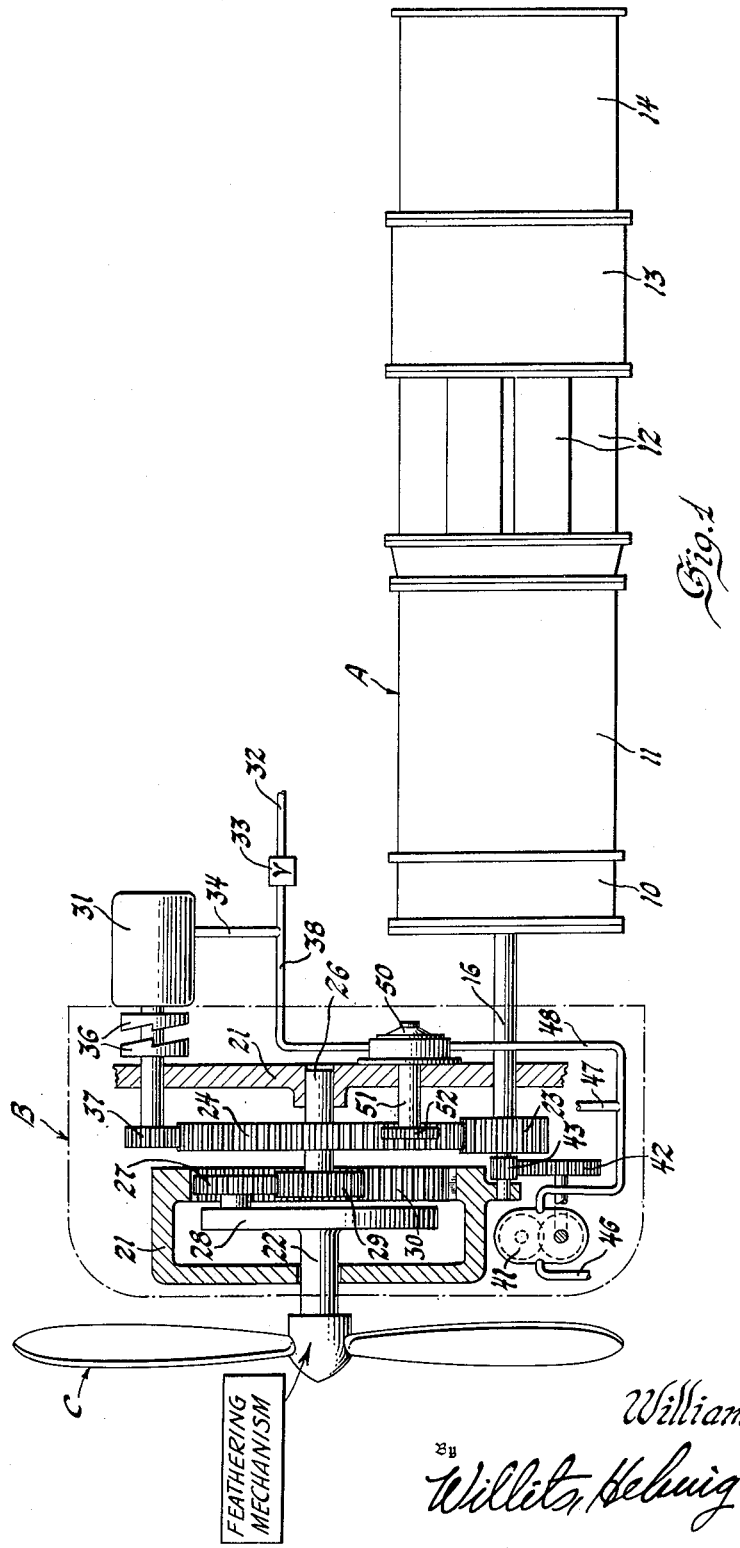

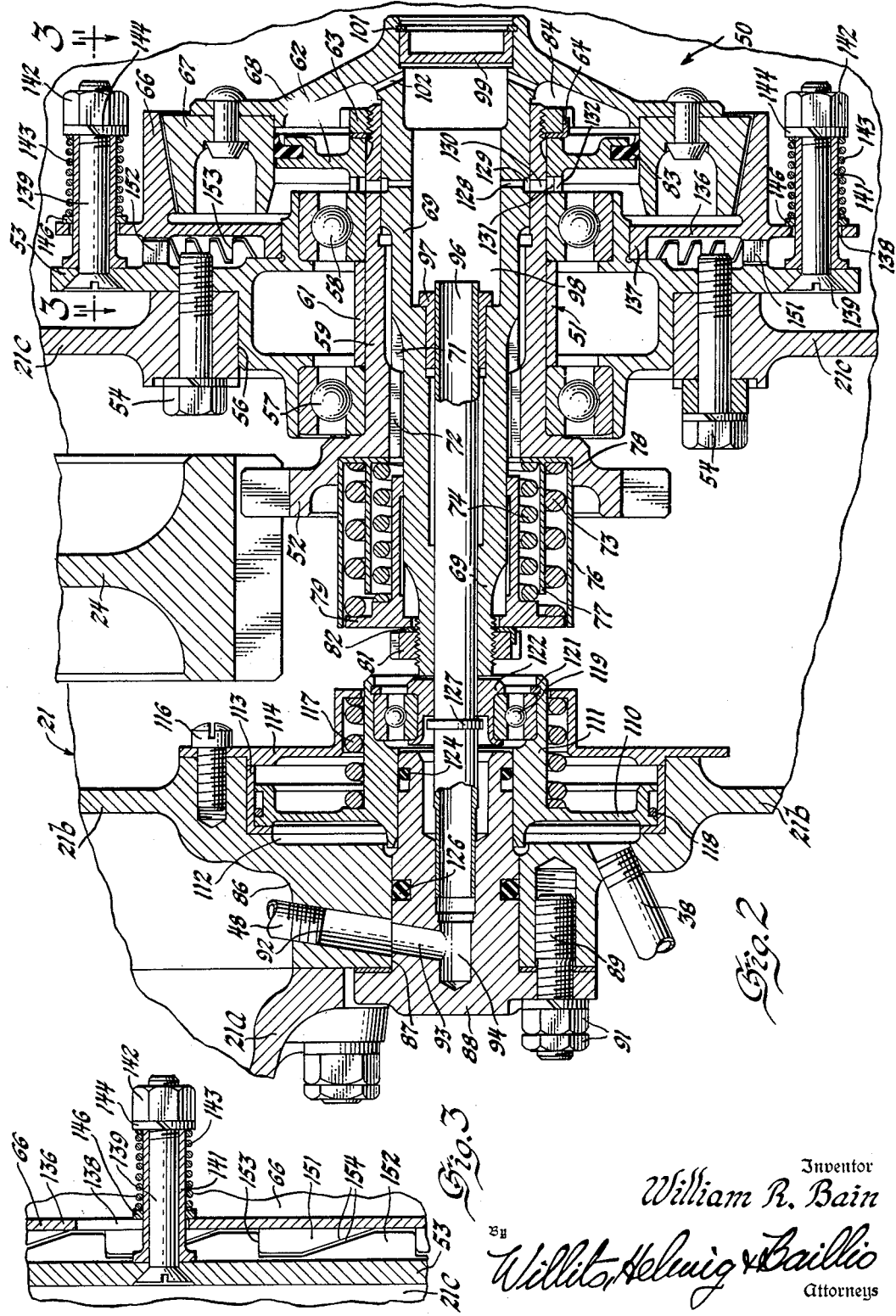

2,737,018

PROPELLER BRAKE SYSTEM

William R. Bain, Indianapolis, Ind., assignor to General Motors Corporation, Detroit, Mich., a corporation of Delaware Application July 1, 1950, Serial No. 171,741

23 Claims. (Cl. 60—39.14)

This invention is directed to power plants and braking systems therefor, and more particularly to an aircraft power plant of the turboprop type incorporating an improved system for restraining the propeller and engine from rotation when the power unit is out of service. The invention will be described in terms of its preferred embodiment in an aircraft power plant. However, it will be understood by those skilled in the art that the invention is applicable to power installations of other types.

In multi-engined aircraft, it is common practice to take one power unit out of service when in flight if necessary because of a casualty to the propulsion unit or desirable for repairs or adjustment during flight. In such cases, the propeller is feathered so as to generate no substantial turning moment from the apparent wind, and to decrease drag of the propeller when held stationary. Also, when aircraft are parked, the propellers are ordinarily feathered to prevent wind acting on the propellers from rotating the engine.

With reciprocating engines, which offer relatively high resistance to rotation, approximate feathering of the propeller is sufficient to maintain the engine stationary. However, in the case of gas turbine engines, the turbine and compressor offer very slight resistance to low speed rotation and it therefore becomes desirable to include a brake in the system to hold the power unit against rotation. It may also be noted that, in the case of gas turbines, ram air or actual wind entering the air intake of the engine and proceeding through the compressor and turbine will rotate the power unit unless it is provided with inlet duct shutters or a brake. While air inlet shutters may be employed, they add to the complexity of the aircraft and provide another source of trouble with the power unit.

Certain turboprop propulsion plants include clutches between the power unit and propeller. A brake adapted for such an installation is disclosed in an application of Victor W. Peterson for "Propeller Drives," Serial No. 128,427, filed Nov. 19, 1949, assigned to the assignee of this application (now abandoned and superseded by continuation-in-part application Serial No. 231,465, filed June 14, 1951). The employment of clutches is undesirable, however, except in installations in which more than one power unit drives a single propeller assembly.

This invention is particularly applicable to power plants in which the engine is not declutched from the load, and, therefore, to obviate undue loading of the engine starter, the brake, which is normally engaged when the power plant is out of operation, should be released for starting the engine.

The principal desirable characteristics of a brake for an aircraft gas turbine propulsion plant are that it be light, compact, and reliable, that it inherently remain engaged when the power plant is out of operation, that it be disengaged when the power plant is in operation, that it be extremely safe against engagement or disengagement at the wrong times, that it brake the mechanism quickly and smoothly and hold it securely at rest, that it require a minimum of energy during operation of the power unit, that it dispense with controls beyond a necessary minimum, and that such controls as are present be simple and reliable.

The principal object of my invention is to provide a braking system which satisfies these requirements to a uniquely high degree, and is thus particularly suited for aircraft turboprop units. Subsidiary objects are to release the brake during energization of the engine starter and hold it released during normal operation of the unit; to provide a brake actuatable by either of two independently-energized fluid cylinders; and to provide a brake of the character recited above which develops an adequate braking torque during rotation of the braked mechanism in one direction and a much greater holding torque in response to reverse rotation of the braked mechanism.

The manner in which the objects of the invention are realized and the novel features and advantages thereof will be apparent to those skilled in the art from the description herein of the preferred embodiment of the invention and the accompanying drawings, in which Figure 1 is a schematic illustration of an aircraft power plant incorporating the invention, Figure 2 is a longitudinal section of the brake, and Figure 3 is a partial sectional view taken on the plane 3—3 indicated in Figure 2.

A power plant of a type in which the invention is advantageously employed, illustrated in Figure 1, includes a gas turbine power unit A, which may be of known type comprising an inlet section 10, a compressor 11, combustion chambers 12 supplied by the compressor, a turbine 13 supplied by the combustion chambers and driving the compressor, and an exhaust section 14. The turbine 13 also drives the output shaft 16 of the power unit by which power is transmitted to a reduction gear assembly B through which the power unit is coupled to a propeller C. The propeller C is illustrated conventionally in the figure, but it is to be understood that the propeller may be of any suitable type, either single or counter-rotating, and provided, as is customary, with mechanism for feathering the blades of the propeller.

The reduction gearing B is illustrated in a schematic manner, inasmuch as the details thereof are not material to the invention. It includes a casing 21 in which are journaled the engine output shaft 16 and the propeller shaft 22. A pinion 23 on the shaft 16 drives a gear 24 on a shaft 26 rotatable in the casing. A planet gear 27 is journaled on a planet carrier 28 fixed to the propeller shaft 22. This planet gear meshes with a ring gear 30 fixed in the casing and with a sun gear 29 fixed on the shaft 26. A double speed reduction between the gas turbine and the propeller is thus provided by the two sets of gears 23, 24 and 27, 30, 29. A starter 31 for the power unit is energized by compressed air from a line 32 through a valve 33 and a conduit 34. The starter is coupled to the engine by an overrunning clutch indicated at 36 and suitable gearing including a pinion 37 meshing with the gear 24. The reduction gear includes a lubricating oil pump 41 driven in any suitable manner, as by gear 42 driven by the pinion 43 on the shaft 16. This pump may take lubricating oil from a sump in the bottom of the reduction gear casing through an intake conduit 46 and supply oil under pressure to lubricate the power plant through a line 47. It will be understood that a common lubricating system for both reduction gear and the power unit may be employed, and that the oil pump may be mounted in the power unit if desired. I consider it preferable, however, to employ an independent lubrication system for the reduction gear, and in this case it is most convenient to utilize the reduction gear lubrication system for actuation of the propeller brake.

A propeller brake 50, illustrated schematically in Figure 1, is coupled to the other elements of the power plant by a shaft assembly 51 and a pinion 52 meshing with the gear 24. This brake, as will appear from the detailed description, is biased toward engagement by a spring, but is released by fluid under pressure from either the starter motor supply or the lubricating oil pump. A conduit 48, connected at all times to the discharge of the oil pump, supplies oil under pressure to the brake and a branch air conduit 38 supplies air under pressure to the brake whenever the valve 33 is opened to actuate the starter.

Considering now the structure of the brake, Figure 2 is a sectional view taken along the axis of the brake including adjacent portions of the reduction gear assembly. By way of orientation, it may be noted that the right hand end of Figure 2 is the end toward the propeller. The reduction gear casing 21 includes a rear wall portion 21a, an intermediate fixed plate or cage 21b, and a second fixed member or cage 21c. The gear 24 and the brake pinion 52 driven thereby are disposed between the 21b and 21c. The brake assembly is installed within the reduction gear housing. The principal mounting element of the brake is a cage member 53 fixed to the plate 21c by cap screws 54. The inner generally cylindrical portion of the cage 53 fits within an opening 56 in the plate 21c and provides a support for the outer races of two ball bearings 57 and 58 which support a shaft 59 integral with the gear 52. Shaft 59 is the major part of shaft assembly 51 previously mentioned. The single cage 53 thus supports the entire rotating assembly of the brake. The inner race of bearing 57 abuts the gear, and a spacing sleeve 61 is provided between the inner races. The bearings are retained by the hub of a fixed rotatable annular piston 62, a nut 63 threaded on the outer end of shaft 59, and a lockwasher 64.

The friction elements are a conical brake drum 66 of steel with a nitrided face and an annular shoe 67 of phosphor bronze engaging the drum, the drum 66 being mounted on the plate 53 and the shoe 67 being mounted on and rotated by the shaft 59 of gear 52. The conical surfaces incline about ten degrees to the axis. The shoe 67 is piloted on a shoulder of a brake wheel 68 and is secured thereto by rivets. The wheel 68 is integral with a hollow shaft 69 which is slidably mounted in the interior of the shaft 59. External splines 71 on the shaft 69 and mating internal splines 72 on the shaft 52 lock the two shafts together for rotation while permitting relative reciprocation. The shaft 69 is urged to the left in Figure 2, to hold the brake shoe 67 in engagement with the drum 66, by coil springs 73 and 74 housed in sleeves 76 and 77, the flanges of which engage the face of gear 52 within a recess 78. The springs are compressed between the flanges of the sleeves and an abutment 79 slidable in the sleeve 76, mounted on the shaft 69, and retained by a nut 81 threaded on the shaft and a lockwasher 82.

The piston 62 is fitted with a resilient sealing ring 83 in a groove in its periphery, which slidably engages the cylindrical inner surface of the brake shoe 67. The piston 62 and wheel 68 thus define an annular chamber 84 of a fluid motor of the movable-cylinder type, supplied with oil to force the brake drum to the right to release the brake. The chamber 84 is supplied from the lubricating oil pump 41 through the conduit 48, as previously stated.

The plate 21b is formed with a heavy section 86 bored at 87 coaxially with the shaft 69. A plug 88 is fitted in the bore 87 and secured by studs 89 passing through a flange of the plug and nuts 91. The portion 86 of the housing is tapped to receive the pipe 48, from which oil is conducted through a passage 92 in the housing and an aligned radial passage 93 in the block 88 to a central bore 94 in the block. A floating oil tube 96 fits closely in the bore 94 and extends into the shaft 69, the end of the tube 96 being guided in and fitting closely within a bushing 97 pressed into the shaft 69. By virtue of the fact that the tube fits freely at both ends, rotation and axial movement of the shaft 69 are accommodated. Oil supplied through the passages 92, 93, 94, and 96 enters a chamber 98 in the interior of shaft 69 which is closed off by plug 99 retained by spring locking ring 101. Radial passages 102 in the shaft conduct the oil from the chamber 98 to the chamber 84 of the motor. When oil is thus supplied under pressure, the wheel 68, shaft 69, and brake shoe 67 move to the right and, because of the conical form of the braking surfaces, the brake is released.

The air motor for releasing the brake comprises an annular piston 110, the cylindrical hub 111 of which slides on a portion of the plug 88 extending from the plate 21b. The piston 110 reciprocates in a cylinder defined by the inner wall of a recess 112 in the wall 21b, a liner 113 pressed into the recess, and a plate 114 piloted in the recess and secured by machine screws 116. The air pipe 38 communicates directly with the chamber 112. The central portion of the plate 114 is cupped to define an abutment for a compression spring 117 which urges the piston 110 to the left. An O-ring 118 is fitted in a circumferential groove of the piston. A ball thrust bearing 119 is fitted in a recess in the piston sleeve 111 and retained by a snap ring 121. The inner race of this bearing is mounted on a thrust member 122, one end of which is spun outwardly to secure it to the bearing, the member 122 being bored for passage of the oil tube 96 therethrough. This thrust member normally clears the end of the shaft 69, but, when the piston 110 is displaced to the right by air pressure, the thrust member 122 moves the shaft 69 to the right to release the brake. The ball bearing 119 is provided because the piston 110 is non-rotating.

O-ring seals 124 and 126 in circumferential grooves in the plug 88 prevent air leakage from the cylinder along the plug. A ring 127 brazed or otherwise fixed to the oil tube 96 may engage the thrust member 122 to prevent the oil tube 96 from sliding out of its seat in the plug 88. Bearings 57, 58, and 119 are lubricated by mist or splash oil in the housing 21.

The brake includes provision for supplying oil to the braking surfaces at the time the brake is engaged to promote smoother engagement and reduce heating and wear of the friction surfaces. The oil is supplied from the chamber 98 in the shaft 69 through radial passages 128 and a circumferential groove 129 in the shaft, radial passages 130 in the shaft 59, and a circumferential groove 131 and notches 132 in the hub of the piston 62, to the space between the piston 62 and the bearing 58. From this space, the oil proceeds outwardly and escapes between the brake members 66 and 67. As will be noted, the groove 129 and passages 130 are in register so that oil may pass through only when the brake approaches the engaged position. In normal operation, with oil pressure in the chamber 84, the lubricating passage is closed because of the displacement of the shaft 69. When oil pressure in the chamber 84 is reduced to the point at which the springs 73 and 74 overcome this pressure and move the brake toward the point of engagement, the lubricating passages are opened and oil displaced from the chamber 84 or supplied by the pump 41 is forced through the passages 128 to 132 to oil the braking surfaces. Since the brake is initially released by air pressure in the chamber 112, the passages 128 are closed when oil pressure is applied. Oil escaping from the brake collects in the sump of the reduction gear.

Since the brake mechanism rotates at over 10,000 revolutions per minute in normal operation, centrifugal force generates a relatively high pressure in the chamber 84, much more than sufficient to hold the brake disengaged. Thus, regardless of variations of the pressure in the lubricating system, or loss thereof, the brake cannot engage at any speed within the operating range of the engine. The brake can engage only when the sum of the axial forces due to the lubricating system pressure and centrifugal force is insufficient to overcome the opposite axial force due to the springs.

The brake further includes a self-energizing feature responsive to reverse rotation of the brake. By virtue of this, when the power plant is shut down, the propeller may be slightly over-feathered so that any tendency to rotate is in the reverse direction. Initiation of such reverse rotation displaces the brake drum 66 axially of the brake, thus increasing the thrust of the springs 73 and 74 and the braking torque. To effect this, the brake drum 66 is mounted for limited rotation and associated with a cam mechanism which moves it to the right, as shown in Figures 2 and 3, upon reverse rotation of the drum. The drum 66 is integral with a disk 136 formed with a flange 137 rotatable upon the outer surface of the cylindrical seat for the bearing 58. The disk 136 projects beyond the brake drum and is formed with slots 138 of limited angular extent. Posts extending from the mounting plate 53 extend through the slots 138. Each post comprises a bolt 139 and a sleeve 141 assembled by a nut 142. A compression spring 143 is mounted over each sleeve 141 and compressed between washers 144 and 146, the latter engaging the disk 136. The disk 136 and brake drum 66 are thus urged to the left, in Figure 2, by the springs 143.

The disk 136 and the mounting plate 53 are both provided with a ring of trapezoidal cams 151 and 152, respectively, which form, as appears most clearly in Fig. 3, a ratchet-like structure. Normally, the vertical cam faces 153 are in engagement. However, if the disk 136 is rotated reversely, the sloping cam faces 154 ride up on each other, camming the disk 136 and brake drum 66 to the right. The brake shoe 67 and shaft 69 are thus moved to the right, further compressing the springs 73 and 74 to provide increased brake torque. The rotation of the disk 136 is permitted and limited by the angular extent of the slots 138 (see Fig. 3). Preferably, the resistance to reverse rotation is about eight times the braking resistance to forward rotation.

The operation of the system, with particular reference to the brake, may be outlined briefly as follows. Assuming that the unit is out of operation, before starting the propeller is unfeathered. Valve 33 is then opened to supply air under pressure to the starter 31 and the cylinder 112 of the brake 50. The brake is thus released, the starter clutch 36 is engaged by mechanism immaterial to the invention, and the power unit and propeller are accelerated by the starter. At an appropriate engine speed, fuel is supplied and ignited and, when the engine operation becomes self-sustaining, the air valve 33 is closed, either manually or by any other appropriate means.

By the time the engine is in operation, the oil pump 41 is turning over at sufficient speed to supply lubricant to the reduction gear and to apply sufficient pressure against the disk 63 of the brake to hold the brake disengaged. The brake thus remains released as long as the power plant is in operation.

If the power plant is shut down, the unit decelerates, principally because of air resistance, and the displacement of the oil pump decreases. Since the output of the pump is partially diverted to the lubrication system, the pressure accordingly decreases. Also, centrifugal force in the chamber 84 diminishes rapidly as speed decreases. Therefore, preferably at about one-third normal engine speed, the pressure decreases to a point at which the springs 73 and 74 begin to apply the brake. From this point on, deceleration is more rapid and, with diminishing oil pressure, the resistance of the brake increases until the propeller is brought to a standstill. Ordinarily, the propeller is feathered when the power unit is shut down.

If the power unit is shut down in flight, the brake is applied in the same manner. In this case, however, the propeller must be feathered since, otherwise, the windmilling of the propeller would maintain the oil pressure in the brake cylinder and hold the brake released.

Much greater resistance to the rotation of the power unit may be generated by slight reverse feathering of the propeller so that the self-energizing feature of the brake becomes effective.

As the brake engages, the braking surfaces are lubricated by oil passing through the ports in the shafts 69 and 59.

The engines may be started in flight with the starter in the same manner as a ground start. However, in flight the engine may be brought to operating speed more easily by simply unfeathering and cranking the engine from the propeller. When this is done, the brake is not full released until approximately 30% of normal propeller speed is reached, but the torque of the propeller, when it is in operating pitch condition, is ample to overcome the resistance of the brake to forward rotation.

The description herein of the preferred embodiment of the invention, for the purpose of explaining the principles thereof, is not to be construed as implying any limitation of the scope of the invention, which is capable of various modifications.

I claim:

1. In a power plant, in combination, an engine, a power output shaft coupled to the engine, a starter for the engine, means for suppling lubricant under pressure to the engine, a brake for the engine, means responsive to energization of the starter for releasing the brake, and means actuated by lubricant under pressure for maintaining the brake released.

2. In a power plant, in combination, a combustion engine, a power output shaft coupled to the engine, a starter for the engine actuated by fluid under pressure, means for supplying lubricant under pressure to the engine, a brake for the engine, a first fluid motor connected in parallel with the starter for releasing the brake, and a second fluid motor actuated by lubricant under pressure for maintaining the brake released.

3. In a power plant, in combination, a combustion engine, a power ouput shaft coupled to the engine, a fluid-operated starter for the engine, a source of fluid under pressure therefor, means for supplying fluid under pressure driven by the engine, a brake for the engine, a first fluid motor supplied from the said source for releasing the brake, and a second fluid motor actuated by fluid under pressure from said means for maintaining the brake released.

4. In a power plant, in combination, a combustion engine, a power output shaft coupled to the engine, a starter for the engine, means for supplying lubricant under pressure to the engine, a brake for the engine, resilient means tending to apply the brake, means responsive to energization of the starter for releasing the brake, and a fluid motor actuated by lubricant under pressure for maintaining the brake released, the said fluid motor comprising a chamber rotated by the engine and so proportioned relative to said resilient means that centrifugal force acting on the fluid therein is sufficient to overcome the resilient means throughout the normal operating range of engine speeds.

5. A power plant comprising, in combination, a propulsion unit including a combustion gas turbine engine, a power output shaft, and means coupling the engine and shaft; a brake coupled to the said unit; means biasing said brake into engagement; power means energized by the unit for releasing the brake; a starter for the propulsion unit; an auxiliary power source for the starter; and means supplied from the auxiliary power source for releasing the brake when the starter is energized.

6. An aircraft power plant comprising, in combination, a propulsion unit including a combustion gas turbine engine, a propeller, and means permanently coupling the engine and propeller; a brake coupled to the said unit; means biasing said brake into engagement; power means energized by the unit for releasing the brake; a starter for the propulsion unit; an auxiliary power source for the starter; and means supplied from the auxiliary power source for releasing the brake when the starter is energized.

7. An aircraft power plant comprising, in combination, a propulsion unit including an engine, a propeller, and means coupling the engine and propeller; a brake coupled to the said unit; means biasing said brake into engagement; power means energized by the unit for releasing the brake; a starter for the propulsion unit; an auxiliary power source for the starter; and means supplied from the auxiliary power source for releasing the brake when the starter is energized.

8. An aircraft power plant comprising, in combination, a propulsion unit including a combustion gas turbine engine, a propeller, and means coupling the engine and propeller; a brake coupled to the said unit; means biasing said brake into engagement; power means energized by rotation of the unit for releasing the brake when the rotational speed is above a predetermined value; a starter for the propulsion unit; an auxiliary power source for the starter; and means supplied from the auxiliary power source for releasing the brake when the starter is energized.

9. An aircraft power plant comprising, in combination, an engine, a propeller, and means coupling the engine and propeller, a starter for the power plant energized by fluid under pressure, a pump coupled to the propeller to be driven thereby, a brake coupled to the propeller, means normally maintaining the brake actuated, a first fluid motor for releasing the brake, means including a controllable valve for concurrently supplying fluid under pressure to the starter and the first fluid motor, and a second fluid motor for releasing the brake supplied by the said pump.

10. A power plant comprising, in combination, an engine, a power output shaft, a reduction gear coupling the engine and shaft, a starter for the power plant energized by fluid under pressure, a lubricating system in the power plant including a pump coupled to the engine and shaft to be driven thereby, a brake coupled to the power plant, means normally maintaining the brake actuated, a first fluid motor for releasing the brake, means including a controllable valve for concurrently supplying fluid under pressure to the starter and the first fluid motor, and a second fluid motor for releasing the brake supplied by the lubricating system pump.

11. An aircraft power plant comprising, in combination, a combustion gas turbine engine, a propeller, a reduction gear coupling the engine and propeller, a starter for the power plant energized by fluid under pressure, a pump coupled to the engine and propeller to be driven thereby, a brake coupled to the power plant, means normally maintaining the brake actuated, a first fluid motor for releasing the brake, means including a controllable valve for concurrently supplying fluid under pressure to the starter and the first fluid motor, and a second fluid motor for releasing the brake supplied by the said pump.

12. An aircraft power plant comprising, in combination, an engine, a featherable propeller, a reduction gear coupling the engine and propeller, a starter for the power plant energized by fluid under pressure, a pressure lubricating system in the power plant, a brake coupled to the power plant, means normally maintaining the brake actuated, a first fluid motor for releasing the brake, means including a controllable valve for concurrently supplying fluid under pressure to the starter and the first fluid motor, and a second fluid motor for releasing the brake supplied by the lubricating system.

13. A brake for an aircraft propulsion unit including an engine, a propeller, a fluid-actuated engine starter, and a pressure lubricant supply, the brake comprising, in combination, a shaft coupled to the propulsion unit for rotation thereby, a brake drum concentric with the shaft, a brake member rotatable with the shaft and reciprocable axially of the shaft into and out of engagement with the drum, resilient means for applying the brake, a first fluid cylinder on the shaft for releasing the brake, a second fluid cylinder aligned with the shaft, a thrust member actuated by the second cylinder to engage the brake member and release the brake, a fluid conduit coupled to the lubricant supply communicating with the first cylinder, and a fluid conduit connecting the second cylinder to the fluid-actuated engine starter.

14. A brake for an aircraft propulsion unit including an engine, a propeller, a fluid-actuated engine starter, and a pressure lubricant supply, the brake comprising, in combination, a shaft coupled to the propulsion unit for rotation thereby, a brake drum concentric with the shaft, a brake member rotatable with the shaft and reciprocable axially of the shaft into and out of engagement with the drum, resilient means for engaging the brake, a first fluid cylinder on the shaft for releasing the brake, a second fluid cylinder aligned with the shaft, a thrust member actuated by the second cylinder to engage the brake member and release the brake, a fluid conduit coupled to the lubricant supply extending through the second cylinder and communicating with the first cylinder, and a fluid conduit connecting the second cylinder to the fluid-actuated engine starter.

15. A brake comprising a rotatable shaft, a brake drum concentric with the shaft, a brake member rotatable with the shaft and reciprocable axially of the shaft into and out of engagement with the drum, resilient means for engaging the brake, a first fluid cylinder on the shaft for releasing the brake, a second fluid cylinder aligned with the shaft, a thrust member actuated by the second cylinder to engage the brake member and release the brake, and a fluid conduit extending through the second cylinder and communicating with the first cylinder.

16. In a power plant, in combination, an engine, a power output shaft coupled to the engine, a starter for the engine, means driven by the engine for supplying fluid under pressure, a brake for the engine, means responsive to energization of the starter for releasing the brake, and means actuated by the said fluid under pressure for maintaining the brake released.

17. In a power plant, in combination, a combustion engine, a power output shaft coupled to the engine, a starter for the engine, means driven by the engine for supplying fluid under pressure, a brake for the engine, resilient means tending to apply the brake, means responsive to energization of the starter for releasing the brake, and a fluid motor actuated by the said fluid under pressure for maintaining the brake released, the said fluid motor comprising a chamber rotated by the engine and so proportioned relative to said resilient means that centrifugal force acting on the fluid therein is sufficient to overcome the resilient means throughout the normal operating range of engine speeds.

18. A brake comprising, in combination, a rotatable shaft, a brake therefor, means normally biasing the brake into engagement, a first fluid motor coupled to the brake for releasing the brake, means actuatable while the shaft is stationary for supplying gas under pressure to the first fluid motor for releasing the brake, a second fluid motor coupled to the brake for releasing the brake, and means actuated by rotation of the shaft for supplying a liquid under pressure to the second fluid motor for releasing the brake.

19. A brake comprising, in combination, a rotatable shaft, a brake therefor, means normally biasing the brake into engagement, a first fluid motor coupled to the brake for releasing the brake, means for initiating rotation of the shaft including means for supplying fluid under pressure to the first gas motor for releasing the brake, a second fluid motor coupled to the brake for releasing the brake, and means operated by rotation of the shaft for supplying a liquid under pressure to the second fluid motor for maintaining the brake released.

20. A brake comprising, in combination, a rotatable shaft, a fixed brake drum concentric with the shaft, a brake member rotatable with the shaft and movable axially of the shaft into and out of engagement with the drum, means normally biasing the brake member into engagement with the brake drum, a stationary fluid motor coupled to the member, means actuatable while the shaft is stationary for supplying fluid under pressure to the first fluid motor for releasing the brake, a second fluid motor rotating with and coupled to the member, and means actuated by rotation of the shaft for supplying fluid under pressure to the second fluid motor for releasing the brake.

21. A brake comprising, in combination, a rotatable shaft, a brake drum concentric with the shaft, a brake member rotatable with the shaft and movable into and out of engagement with the drum, means normally biasing the brake into engagement, a fluid motor rotatable with the shaft and coupled to the member energizable to release the brake, a stationary fluid motor energizable to release the brake, a rotatable coupling between the stationary fluid motor and the member, and separately actuated means for supplying fluid to each of the said fluid motors.

22. In a power plant, in combination, an engine, a propeller constantly coupled to the engine, a starter for the engine, means driven by the engine and propeller for supplying fluid under pressure, a brake for the engine and propeller, means responsive to energization of the starter for releasing the brake, and means actuated by the said fluid under pressure for maintaining the brake released.

23. An aircraft propulsion power plant comprising, in combination, a constantly coupled rotating system including an engine, a propeller, fluid pumping means, and a first brake member; a starter for starting the rotating system, a second brake member coacting with the said first brake member to constitute a brake for the rotating system, means responsive to energization of the starter for releasing the said brake, and means actuated by fluid delivered by the said pumping means for maintaining the brake released.

References Cited in the file of this patent

UNITED STATES PATENTS

| | | |
|---|---|---|
| 365,647 | Solano | June 28, 1887 |
| 2,141,091 | Quick | Dec. 20, 1938 |
| 2,304,560 | Freeman | Dec. 8, 1942 |
| 2,344,083 | Freitag | Mar. 14, 1944 |

FOREIGN PATENTS

| | | |
|---|---|---|
| 449,951 | Great Britain | July 3, 1936 |